United States Patent
Reider et al.

(10) Patent No.: US 11,060,744 B2
(45) Date of Patent: Jul. 13, 2021

(54) METHOD, ARRANGEMENT, AND COMPUTER PROGRAM PRODUCT FOR OPERATING AN HVAC INSTALLATION

(71) Applicant: BELIMO HOLDING AG, Hinwil (CH)

(72) Inventors: Forest Reider, Wetzikon (CH); Marc Thuillard, Uetikon am See (CH); Peter Schmidlin, Uster (CH); Stefan Mischler, Wald (CH); Ronald Aeberhard, Grut (CH); Hou Yin Chan, Subang Jaya (MY); Wee Ming Goh, Singapore (SG)

(73) Assignee: BELIMO HOLDING AG, Hinwil (CH)

( * ) Notice: Subject to any disclaimer, the term of this patent is extended or adjusted under 35 U.S.C. 154(b) by 406 days.

(21) Appl. No.: 16/067,898

(22) PCT Filed: Feb. 9, 2017

(86) PCT No.: PCT/EP2017/052880
§ 371 (c)(1),
(2) Date: Jul. 3, 2018

(87) PCT Pub. No.: WO2017/144285
PCT Pub. Date: Aug. 31, 2017

(65) Prior Publication Data
US 2020/0300487 A1    Sep. 24, 2020

(30) Foreign Application Priority Data

Feb. 22, 2016 (CH) .................................. 00230/16

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/56* (2018.01); *F24F 11/64* (2018.01); *F24F 11/65* (2018.01);
(Continued)

(58) Field of Classification Search
CPC .. F24F 11/30; F24F 11/52; F24F 11/56; F24F 11/64; F24F 11/65; F24F 11/83;
(Continued)

(56) References Cited

U.S. PATENT DOCUMENTS 4,766,553 A     8/1988  Kaya et al.
4,955,205 A  *  9/1990  Wilkinson ............ F24F 3/1417
                                                  62/176.4

(Continued)

FOREIGN PATENT DOCUMENTS

EP    2 918 961 A1    9/2015
GB    2 510 654 A     8/2014
WO    2006/000262 A1  1/2006

OTHER PUBLICATIONS

International Search Report for PCT/EP2017/052880 dated May 23, 2017 [PCT/ISA/210].

(Continued)

*Primary Examiner* — Emmanuel E Duke
(74) *Attorney, Agent, or Firm* — Sughrue Mion, PLLC

(57) ABSTRACT

A method, system (100), and a computer program product comprising a non-transient computer-readable medium (190) having stored thereon computer program code configured to control one or more processors (180) of a computer (170) for operating an HVAC installation (200, 300), wherein a set of enthalpies ($H_{1,i}$, $H_{2,i}$, $H_{1,o}$, $H_{2,o}$) and flow rates ($\phi_1$, $\phi_2$) as variables of the HVAC installation (200, 300) is monitored and used for controlling the operation of said HVAC installation (200, 300), comprising the steps of:

(Continued)

(a) dividing said set of enthalpies ($H_{1,i}$, $H_{2,i}$, $H_{1,o}$, $H_{2,o}$) and flow rates ($\phi_1$, $\phi_2$) into a first and second subset; (b) measuring each variable of said first subset with a related sensor (110, 120) arranged in said HVAC installation (200, 300); and (c) determining the variables of said second subset from the measured variables of said first subset by using a mathematical and/or empirical relationship between the variables of said first and second subset.

28 Claims, 7 Drawing Sheets

(51) Int. Cl.
    *F24F 11/65*     (2018.01)
    *F24F 11/83*     (2018.01)
    *F24F 11/56*     (2018.01)
    *G05B 15/02*     (2006.01)
    *F24F 110/00*     (2018.01)
    *F24F 140/20*     (2018.01)
    *F24F 11/52*     (2018.01)
    *F24F 110/10*     (2018.01)
    *F24F 110/12*     (2018.01)

(52) U.S. Cl.
    CPC .............. *F24F 11/83* (2018.01); *G05B 15/02* (2013.01); *F24F 11/52* (2018.01); *F24F 2110/00* (2018.01); *F24F 2110/10* (2018.01); *F24F 2110/12* (2018.01); *F24F 2140/20* (2018.01)

(58) Field of Classification Search
    CPC .............. F24F 2110/00; F24F 2110/10; F24F 2110/12; F24F 2140/20; G05B 15/02
    See application file for complete search history.

(56) References Cited

U.S. PATENT DOCUMENTS

2012/0216123 A1*   8/2012   Shklovskii ......... G06Q 30/0201
                                                        715/738
2015/0153119 A1    6/2015   Friedl et al.

OTHER PUBLICATIONS

Swiss Search Report for CH 2302016 dated Jun. 24, 2016 [PCT/ISA/201].

* cited by examiner

METHOD, ARRANGEMENT, AND COMPUTER PROGRAM PRODUCT FOR OPERATING AN HVAC INSTALLATION

CROSS REFERENCE TO RELATED APPLICATIONS

This application is a National Stage of International Application No. PCT/EP2017/052880 filed Feb. 9, 2017, claiming priority based on Swiss Patent Application No. 00230/16 filed Feb. 22, 2016.

FIELD OF THE INVENTION

The present invention relates to a method, an arrangement, and a computer program product for operating an installation for heating, ventilation and air conditioning (HVAC).

BACKGROUND OF THE INVENTION

In HVAC installations, which are used for heating, cooling, air conditioning and venting of rooms and buildings, flow rates of fluids have to be permanently adapted to current requirements. The requirements depend on parameters determining the demand for heating, ventilation and air conditioning within the building, such as outside temperature, humidity, solar radiation, as well as the number of people or other organisms, machines and devices within the building, which may consume fresh air and emit energy. In particular fluid flow within heat exchangers as well as mergers and splitters has to be controlled for optimizing energy exchange between the fluids.

In HVAC installations, heat and/or cold are/is normally generated centrally in order to be led via a suitable heat transfer medium, e.g. water, to the respective premises where the heat and/or cold are/is emitted into the buildings or at least certain rooms thereof via local heat exchangers. The heat flow emitted or absorbed by the local heat exchanger, which is required for achieving a predetermined room temperature, is often controlled in such a manner that the mass flow on the primary side of the heat transfer medium is changed accordingly.

Alternatively, outside air can be centrally cooled and then led to the respective premises which may be single rooms or stories of buildings or entire buildings in networks for districts comprising several buildings (so-called district heating and/or district cooling networks). Especially within the latter, diameters of central air ducts leading to and away from a central heat exchanger, may be several meters wide in diameter. Due to boundary curve effects of the airflow inside such ducts with relatively large diameters, flow rates may not be measured accurately anymore by means of sensors only placed at the walls of the ducts.

Hence, according to the prior art, a plurality of flow sensors is placed within such ducts in order to provide a grid of sensors equally distributed along the cross-section of the duct in order to overcome the boundary curve effects. The sensors are usually arranged along several rods, which extend between opposing walls of the duct.

However, such arrangements of sensors according to the prior art have several disadvantages. First of all, by arranging the rods within the fluid flow, they become obstacles impairing flow characteristics. Flow resistance is increased and thus energy demands for pumps or fans moving the fluid rise. Moreover, the sensors as well as the rods carrying them are prone to fouling. Residues like dust or dirt may build up on the rods and sensors, which again impairs flow characteristics. On the other hand, measurement accuracy of the sensors may be decreased. Finally, installing, operating and maintaining sensor arrangements produce costs with a negative economic effect for the entire HVAC installation.

The same as outlined above for flow sensors may also hold for enthalpy sensors used for measuring the enthalpy of the first or second fluid, in order to derive therefrom an enthalpy difference and, thus, an amount of thermal energy exchanged between the fluids. Even though, their installation in relatively large ducts may be less problematic than for flow sensors, the enthalpy sensors remain still an important factor in assembly, operation and maintenance and, thus, the overall costs of the HVAC installation.

SUMMARY OF THE INVENTION

In view of the disadvantages of flow and enthalpy measurement arrangements known from the prior art as described above, it is an object of the present invention to provide a method and a system for determining flow rates and/or enthalpy differences in an HVAC installation, especially in a heat exchanger, which method and system do not have at least some the disadvantages of the prior art. In particular, it is an object of the present invention to provide a method and a computer system for determining the flow rates and/or enthalpy differences in an HVAC installation with a reduced number of sensors.

According to the present invention, these objects are achieved through the features of the independent claims. In addition, further advantages embodiments follow from the dependent claims and the description.

In a method according to the present invention for operating an HVAC installation, a set of enthalpies and flow rates as variables of the HVAC installation is monitored and used for controlling the operation of said HVAC installation, comprising the steps of: (a) dividing said set of enthalpies and flow rates into a first and second subset; (b) measuring each variable of said first subset with a related sensor arranged in said HVAC installation; and (c) determining the variables of said second subset from the measured variables of said first subset by using a mathematical and/or empirical relationship between the variables of said first and second subset.

Thereby, the method according present invention has the decisive advantage over the prior art that at least one of the sensors for measuring the value of the flow rates or the value of the enthalpies may be omitted or replaced by an auxiliary, non-calibrated sensor. The omitted sensors are so to say virtualized. By providing virtual sensors in a method according to the present invention, the number of installed sensors is reduced in comparison to the prior art. Thereby, the present invention enables to reduce the number of sensors or use cheaper auxiliary sensors, maintain desired flow characteristics within the ducts or any fluid lines in general and helps to minimize the overall costs of HVAC installations.

In an embodiment of the invention, at least one non-calibrated auxiliary sensor is provided to measure one variable of said second subset, and said at least one non-calibrated auxiliary sensor is calibrated by using the respective determined variable of said second subset.

Such a way of calibrating a sensor enables to utilize sensors of a certain quality or arrange sensors in such a way, which helps to minimize costs and impacts on fluid lines.

In another embodiment of the invention, at least one of said variables of said first subset is kept constant. Thereby, the number of variables to be determined by actual measurements can be further reduced.

The actual value of said constant variable may be only once measured with a sensor.

The single measurement can be used for deriving at least one reference value therefrom.

In a further embodiment of the invention a set of values associated with a heat exchanger of the HVAC installation is determined, the set comprising: flow rates and enthalpy differences of a first fluid and a second fluid in a configuration for exchanging thermal energy between the fluids through the heat exchanger, the enthalpy differences each being a difference between a fluid inlet enthalpy and a fluid outlet enthalpy of the fluids when entering and exiting the heat exchanger, respectively, whereby a subset of values comprising at least two values of the flow rates and the enthalpy differences is measured; and the complete set of values is determined, using the measured subset of the values.

For example, the value of the second flow rate and the value of the second enthalpy difference may be acquired by means of one or more sensors. Then the value of the first flow rate may be calculated as a function of the value of the first enthalpy difference the value of the second enthalpy difference, and the value of the second flow rate. Alternatively or additionally, the value of the first enthalpy difference may be calculated as a function of the value of the first flow rate, the value of the second enthalpy difference, and the value of the second flow rate.

In another embodiment, a full or complete set of values of an energy balance equation set up with respect to an energy related envelope boundary of a heat exchanger may be determined. The envelope boundary delimits the heat exchanger as a thermodynamic system e. g. by walls, insulation, etc. Any space outside the boundary may be regarded as surroundings or environment of the heat exchanger.

In another embodiment, the energy balance equation comprises at least one efficiency factor representing a thermodynamic loss with respect to the respective envelope boundary. Thermodynamic loss may occur, when heat a transfers takes place across the boundary besides as through the fluids, such as by heat transmission through walls or insulation. Also dissipation of energy within the fluids when passing through the heat exchanger may be taken into account in the efficiency factor. Ideally, the efficiency factor would yield to having a value of one and may thus be omitted.

In just another embodiment of the invention, at least one of the values of the flow rates and the enthalpy differences is used for calibrating a non-calibrated auxiliary flow sensor or a non-calibrated auxiliary enthalpy sensor for acquiring the value of one of the flow rates or enthalpy differences, respectively.

In particular, at least one of the value of the first flow rate or the value of the second flow rate may be used for calibrating an auxiliary flow sensor which is used for acquiring the value of the first flow rate or the value of the second flow rate when the second fluid or the first fluid, respectively is essentially stationary within the heat exchanger. In other words, the calibrated auxiliary flow sensor may be used for acquiring the value of the first flow rate or the value of the second flow rate when the second fluid or first fluid, respectively, is essentially not flowing. This may be the case, when for example during periods where neither heating nor cooling is required, the first fluid travels through the heat exchanger to the respective premises where it is required while the second fluid is not being processed.

As an auxiliary flow sensor, a non-calibrated flow sensor may be used which is not arranged as the flow sensors according to the prior art described above. The auxiliary sensor may be designed such that it is of especially low-cost and does not protrude into the respective fluid line in an undesired way. In calibrating the auxiliary sensor during a cooling or heating period, correction factors for measurement signals gained by the auxiliary sensor may be determined which allow for acquiring the respective flow rate with sufficient accuracy.

In another embodiment of the invention, the non-calibrated auxiliary enthalpy sensor comprises a non-calibrated auxiliary temperature sensor and/or a non-calibrated auxiliary humidity sensor used in conjunction with a look up table or function for determining a value of at least one of said enthalpies.

Hence, for measuring or determining an enthalpy it may not be necessary to determine both, temperature and humidity of a fluid. Alternatively or additionally, only one of the temperature and humidity may be measured by a respective sensor, while the respective other one is virtualized and may therefore be omitted.

In a further embodiment of the invention, at least one of the values of the flow rates is a predetermined constant value.

In particular, at least one of the value of the first flow rate and the value of the second flow rate may be a predetermined constant value. Some heat exchangers or HVAC installations work with constant flow rates. If the constant value of such a constant flow rate is known, the respective other flow rate can be calculated by using a transposed energy balance of the heat exchanger.

In another embodiment of the invention, the predetermined constant value is determined using a temporary flow sensor, temporarily placed for measuring the value of the respective flow rate.

The predetermined constant value may be acquired by means of the temporary sensor temporarily placed for measuring the value of the first flow rate or the value of the second flow rate, respectively.

The temporary sensor may be placed, for example, in the first fluid line or the second fluid line transporting the first and the second fluid, respectively. By means of the temporary sensor, a one-time measurement of at least one of the flow rates to be acquired may be carried out. Based on this measurement, the predetermined constant value may be set up.

In just another embodiment of the invention, at least one of the values of the flow rates is determined by means of an operational parameter of a pump, a fan, a valve and/or a damper configured to respectively move, direct, block, split or merge at least one of the fluids.

In particular, the value of the first flow rate and/or the value of the second flow rate may be determined by means of such an operational parameter, which may be a frequency, a current, a voltage, a pressure, a position or the like. The at least one pump or fan may be at least partly arranged within and/or connected to the first or second fluid line.

By using the operational parameter, a flow sensor for measuring the flow rate of the respective fluid driven or moved by the pump or fan may be omitted. By omitting the flow sensor, the respective flow rate is determined by a virtual sensor.

The operational parameter may be a variable operational parameter of a drive of the pump, fan, valve or damper.

The operational parameter may be a variable frequency of a drive of the pump and/or fan. The variable frequency maybe a rotational speed of the drive or a shaft attached thereto for driving the pump or fan. Alternatively or additionally, other operational parameters of the pump, the fan and/or a respective drive, such as electrical currents, voltages and/or hydraulic pressures, may be used as required within a certain application for calculating the operational parameter from which at least one of the flow rates may be derived.

In another embodiment of the invention associated with a heat exchanger of the HVAC installation the method comprises the steps of: recording in a computer at least one measurement data set, which includes a plurality of data points representing measured values of at least one of the enthalpy differences in dependence of values of the respective flow rate; calculating by the computer a curve or lookup table of values of the enthalpy difference from the at least one measurement data set; and predicting the enthalpy difference or the respective flow rate by looking up a corresponding value of the respective flow rate or of the enthalpy difference, respectively, based on the curve or lookup table.

In other words, calculating the curve or lookup table may involve calculating a function of the second flow rate based on the at least one measurement dataset.

The calculation of the curve or lookup table may involve calculating based on the at least one measurement data set a function of an inlet enthalpy difference and/or an outlet enthalpy difference, the inlet enthalpy difference being a difference between a first fluid inlet enthalpy and a second fluid inlet enthalpy, and the outlet enthalpy difference being a difference between a first fluid outlet enthalpy and a second fluid outlet enthalpy.

Alternatively or additionally, calculation of the curve or lookup table involves calculating based on the at least one measurement data set a function of an inlet temperature difference and/or an outlet temperature difference, the inlet temperature difference being a difference between a first fluid inlet temperature and a second fluid inlet temperature, and the outlet temperature difference being a difference between a first fluid outlet temperature and a second fluid outlet temperature.

Further, at least one of the values of the flow rates and the enthalpies may be temporarily measured by means of at least one of a temporarily placed flow sensor and a temporarily placed enthalpy sensor, respectively, preferably during a commissioning of the heat exchanger, for establishing a curve fit of the curve of values of the enthalpy difference with respect to the at least one measurement dataset.

Especially, establishing the curve fit may be based on at least one curve fit coefficient.

By measuring or determining the enthalpies of the first and of the second fluid and temporarily the second flow rate of the second fluid, the second enthalpy difference of the second fluid may be predicted by determining the curve fit based on the at least one curve fit coefficient. Once the relationship is established, it can be used to calculate the second flow rate when the temporary sensor is not present anymore.

With the calculated second flow rate, the first flow rate may be calculated.

The at least one curve fit coefficient may be derived from a power or a heat transfer fit function of the thermal energy exchanged dependent on the value of the respective flow rate.

Alternatively, the at least one curve fit coefficient may be derived from an enthalpy fit function of the value of the enthalpy difference dependent on the value of the respective flow rate.

Furthermore, the at least one curve fit coefficient may be derived from a temperature fit function of a value of a temperature difference dependent on the value of the respective flow rate, the temperature difference being a difference between an outlet temperature of the respective fluid exiting the heat exchanger and a fluid inlet temperature of the respective fluid entering the heat exchanger.

In another embodiment, a method according to the present invention further comprises normalizing at least one of the measurement data set, data point or any curve or lookup table derived therefrom in order to obtain at least one of a normalized data set, normalized data point, normalized curve or normalized lookup table. Normalization may not only be achieved by using an average, but alternatively e.g. simply a difference, or some other function of the fluid values.

In other words, though the curve fit and possibly normalization operations, only one of the value of the second flow rate or the value of the second enthalpy difference needs to be measured or otherwise determined in order to then look up the corresponding value not measured in the curve or normalized curve. The curve or normalized curve may therefore be used as or at least partly constitute a look up table for predicting enthalpy differences or flow rates. This helps to replace at least one sensor by a virtual sensor. When measuring a flow rate, the corresponding enthalpy difference may be predicted. Thus, two enthalpy sensors for measuring the respective enthalpy difference may be omitted. Alternatively, one of the enthalpy differences may be measured and a sensor for acquiring the corresponding flow rate may be omitted.

In another embodiment of the invention, at least one of the values of the flow rates or the enthalpies is derived from a corresponding value of a branch flow rate or a branch enthalpy of a partial fluid stream or flow of at least one of the fluids.

Hence, not for all of the branches or their combinations, respective flow rates and enthalpies have to be measured. By deriving at least some of the flow rates and enthalpies, at least one more sensor may be calibrated, normalized, parameterized, and/or virtualized.

In a further embodiment of the invention, the first fluid is a gas or gas mixture and the second fluid is a liquid or liquid mixture. In particular in a HVAC installation, the gas may be air and the liquid may be water, glycol or a mixture thereof.

Alternatively or additionally, the method according to the present invention is applicable for any other kind of combination or mixture of fluids used as the first fluid and the second fluid.

In addition to a method of determining a set of values associated with a heat exchanger, the present invention also relates to an arrangement, in particular an HVAC installation or a heat exchanger network, wherein a set of enthalpies and flow rates as variables of the HVAC installation or heat exchanger network is monitored and used for controlling the operation of said HVAC installation or heat exchanger network, comprising: (a) means for dividing said set of enthalpies and flow rates into a first and second subset; (b) a related sensor arranged in said HVAC installation or heat exchanger network for measuring each variable of said first subset; and (c) means for determining the variables of said second subset from the measured variables of said first subset by using a mathematical and/or empirical relationship between the variables of said first and second subset.

In an embodiment of the inventive arrangement and according to another aspect which on its own can be regarded an independent solution of the above-mentioned objects underlying the present invention, the arrangement further comprises a system for implementing and executing the method; specifically, a system for determining a set of values associated with a heat exchanger, the set comprising: flow rates and enthalpy differences of a first fluid and a second fluid in a configuration for exchanging thermal energy between the fluids through the heat exchanger, the enthalpy differences each being a difference between a fluid inlet enthalpy and a fluid outlet enthalpy of the fluids when entering and exiting the heat exchanger, respectively, the system comprising a computer with a processor configured to: measure a subset of values comprising at least two values of: the flow rates and the enthalpy differences; and determine the complete set of values using the measured subset of the values.

The system is configured to implement embodiments of the method described above. Several of the systems may be combined and correspondingly embodiments of the method described above may be implemented for each of the systems.

In another embodiment of the inventive arrangement and according to another aspect which on its own can be regarded an independent solution of the above-mentioned objects underlying the present invention, the arrangement further comprises at least one of: a mixing unit and a splitting unit merging or diverging, respectively, a number m of fluids and partial fluids having a number of m respective flow rates and partial flow rates and a number of m respective enthalpies and partial enthalpies, wherein the system is configured to measure a number of maximally m-1 of the flow rates, partial flow rates enthalpies and partial enthalpies, and configured to calculate from the measured maximally m-1 flow rates, partial flow rates enthalpies, and partial enthalpies at least one of the flow rates, partial flow rates, enthalpies, and partial enthalpies.

Hence, for each and every merging and/or diverging of fluids, at least for one of the merged and/or diverged streams, respective flow rates, temperatures, humidities, and/or enthalpies may be calculated based on the measurements relating to the other streams. This helps to further omit sensors and/or to replace sensors according to the prior art with auxiliary sensors. Additionally or alternatively, at least one more sensor may be calibrated, normalized, parameterized, and/or virtualized.

In addition to a method and a system for determining a set of values associated with a heat exchanger, the present invention also relates to a computer program product for controlling a system or computer, respectively, to implement and execute the method; specifically, a computer program product comprising a non-transient computer-readable medium having stored thereon computer program code configured to control one or more processors of a computer for operating an HVAC installation by monitoring a set of enthalpies and flow rates as variables of the HVAC installation and using the set of enthalpies and flow rates for controlling the operation of said HVAC installation, such that the computer (a) divides said set of enthalpies and flow rates into a first and second subset; (b) measures each variable of said first subset with a related sensor arranged in said HVAC installation; and (c) determines the variables of said second subset from the measured variables of said first subset by using a mathematical and/or empirical relationship between the variables of said first and second subset.

In further embodiments, the computer program code is configured to control the one or more processors of the computer such that the computer implements embodiments of the method described above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
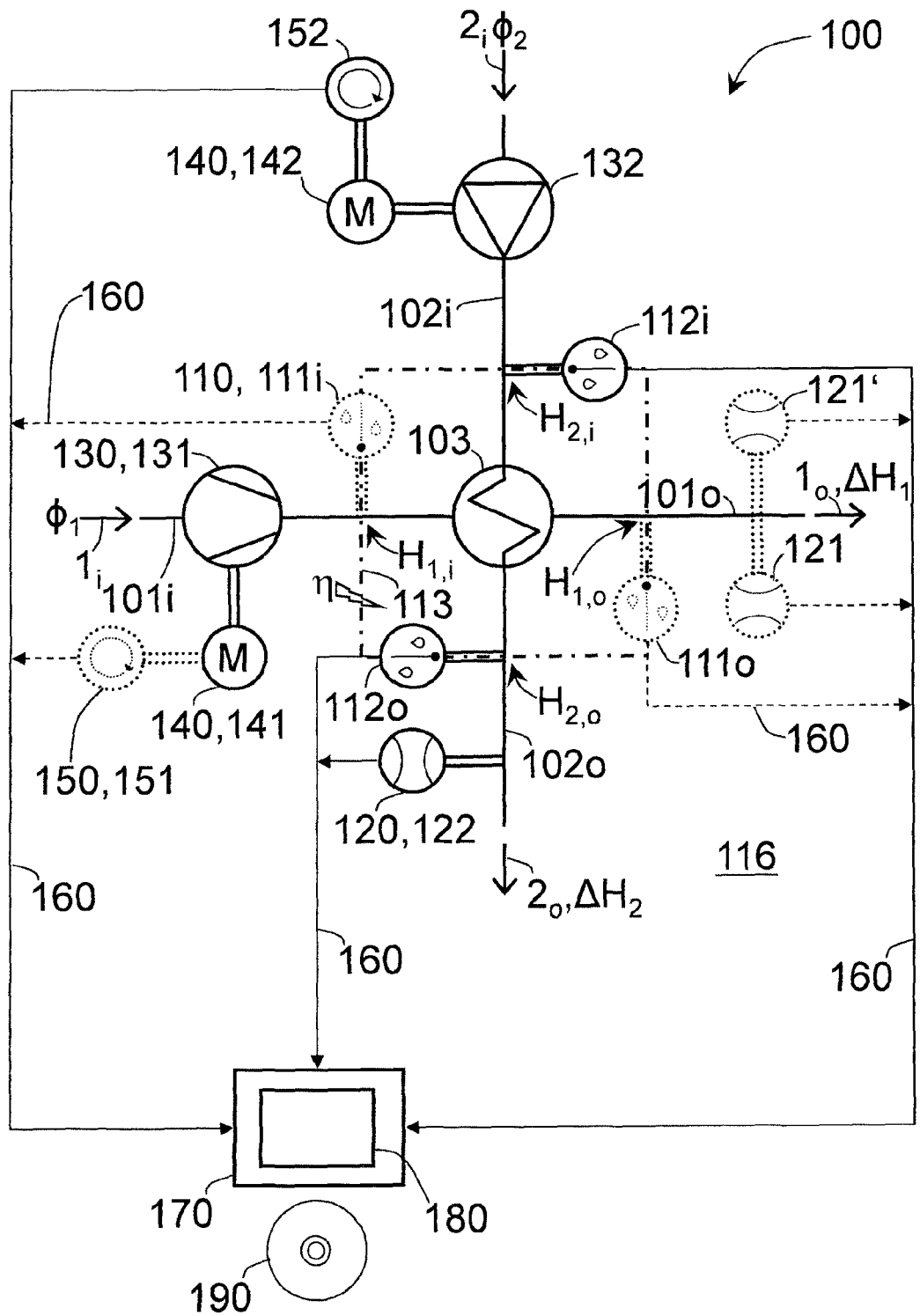
FIG. 1: shows a schematic diagram illustrating examples of systems according to the present invention.

FIG. 1 shows a schematic diagram illustrating heat exchange between a first fluid 1 and a second fluid 2 in a system 100 according to the present invention. The system 100 comprises a first fluid line 101 for guiding the first fluid 1 and a second fluid line for guiding the second fluid 2. The first fluid line 101 and the second fluid line 102 are each connected to a heat exchanger 103, wherein thermal energy is exchanged between the first fluid 1 and the second fluid 2.

The first fluid line 101 and the second fluid line 102 each have an inlet section 101$i$, 102$i$, and an outlet section 101$o$, 102$o$, respectively. The inlet sections 101$i$, 102$i$ lead to and the outlet sections 101$o$, 102$o$ lead away from the heat exchanger 103 and can be at least partially integrated therein. The first fluid line 101 and the second fluid line 102 maybe each provided with enthalpy sensors 110, such as a first enthalpy sensor 111 and a second enthalpy sensor 112, respectively. In particular, the inlet sections 101$i$, 102$i$ may be each provided with an inlet enthalpy sensor 111$i$ and 112$i$, respectively. The outlet sections 101$o$, 102$o$ may be each provided with an outlet enthalpy sensor 111o and 112o, respectively. The enthalpy sensors 111, 111i, 111o, 112, 112i, 112o may be located on an energy-related envelope boundary 113 of the heat exchanger 103 or at least in the vicinity of the envelope boundary 113 such that respective inlet and outlet enthalpies of the first fluid 1 and the second fluid 2 may be measured with a satisfying accuracy.

The envelope boundary 113 separates the heat exchanger 103 as a thermodynamic system from an environment 116 surrounding it. The envelope boundary 113 may comprise any kind of walls, isolation or alike. Any heat crossing the boundary of the heat exchanger other than through the fluids 1, 2 and losses due to entropy generation within the heat exchanger 103 due to irreversibilities associated with heat transfer, fluid friction, and the maximum capacity rate of the heat exchanger limiting heat transfer between the fluids 1, 2 is considered as a thermodynamic loss. Such losses are included in a respective efficiency factor η of the heat exchanger.

Flow sensors 120, such as a first flow sensor 121 and a second flow sensor 122 may be at least partially placed within or connected to the first fluid line 101 and the second fluid line 102, respectively, in such a way that a first flow rate $\phi_1$ of the first fluid 1 and a second flow rate $\phi_2$ of the second fluid may be measured. Additionally or alternatively, an auxiliary flow sensor 120' maybe at least partially arranged within or connected to the first fluid line 101, such that the auxiliary flow sensor 120' may be calibrated for acquiring the value of the first flow rate $\phi_1$.

Pumps or fans 130, such as a first pump or fan 131 and a second pump or fan 132 are partly arranged within the first fluid line 101 and the second fluid line 102 or connected thereto for moving the first fluid 1 and the second fluid 2 through the fluid lines 101, 102, respectively, and thus through the heat exchanger 103. The first and the second pump or fan 131, 132 may be driven by motors or drives 140, such as a first motor or drive 141 and a second motor or drive 142, respectively. The motors 140, 141, 142 may be provided with meters 150, such as a first meter 151 and a second meter 152, respectively, for measuring a variable frequency of the first drive 141 and/or the second drive 142 and/or the first pump or fan 131 and/or the second pump or fan 132, respectively.

The system 100 further comprises transmission lines 160 for transmitting data and/or information between the enthalpy sensors 110, 111, 112, flow sensors 120, 120'. 121, 122, meters 150, 151, 152 and a computer 170. The computer 170 comprises and/or is connected to at least one processor 180 and can read from and/or write onto a computer-readable medium 190 for reading therefrom and/or storing thereon computer program code configured to control the one or more processors 180 of the computer 170.

Figure 2:
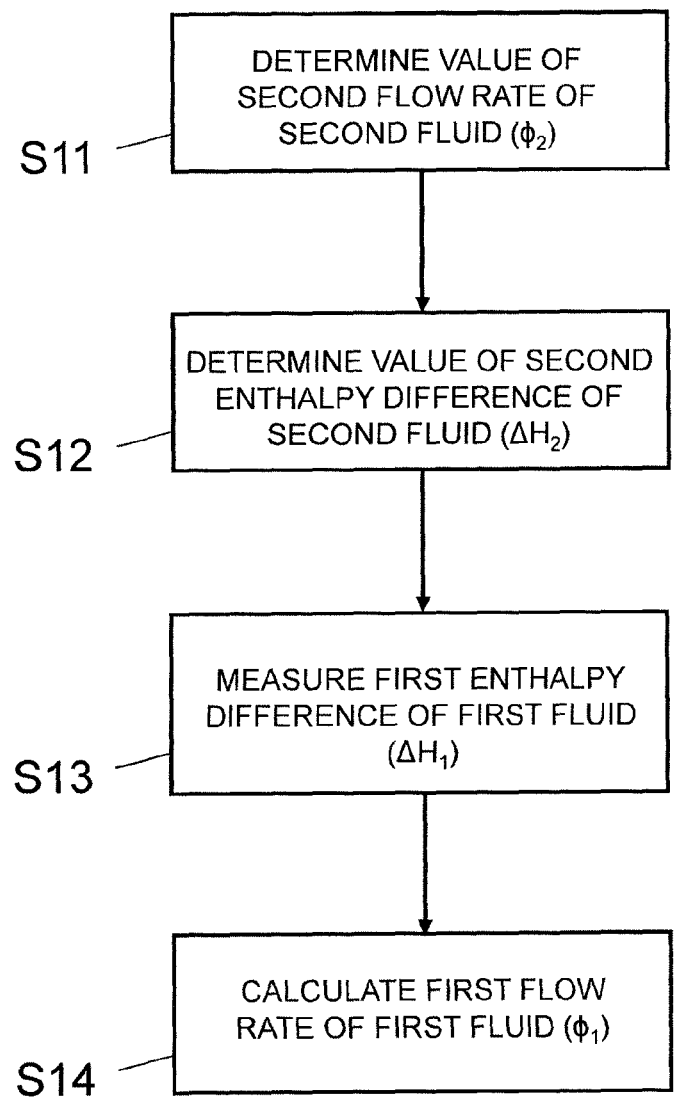
FIG. 2: shows a schematic block diagram illustrating an exemplary sequence of steps for determining a first flow rate of a first fluid according to an embodiment of the present invention.

FIG. 2 shows an exemplary block diagram with steps S11 to S14 for determining the first flow rate $\phi_1$ of the first fluid 1 in line with a method according to the present invention. In the first step S11, the value of the second flow rate $\phi_2$ of the second fluid 2 is determined. Therefore, the second flow rate may be either measured by means of the second flow sensor 122 and/or the second meter 152. Alternatively or additionally, the value of the second flow rate $\phi_2$ is predicted by looking up its value as described in detail reference to FIGS. 4 to 6 further down below.

A function for calculating the value of the first rate $\phi_1$ or the value of the first enthalpy difference $\Delta H_1$, respectively, may be derived from an energy balance equation set up with respect to the energy-related envelope boundary 113 of the heat exchanger 103. The first fluid 1 and the second fluid 2 may be assigned to a primary or secondary side of the heat exchanger 103 which is configured to exchange energy between the primary side and the secondary side as desired. The energy balance equation is defined as follows:

$$Q = \Phi_1 \cdot \Delta H_1 = \Phi_2 \cdot \Delta H_2 \cdot \eta, \qquad (1)$$

wherein $\phi_1$ is the flow rate of the first fluid, $\phi_2$ is the flow rate of the second fluid, $\Delta H_1$ a first enthalpy difference and $\Delta H_2$ is a second enthalpy difference, Q is the exchanged amount of thermal energy, and η represents the efficiency factor of the heat exchanger.

The first enthalpy difference $\Delta H_1$ is defined as the magnitude of the difference between the first fluid inlet enthalpy $H_{1,i}$ and the first fluid outlet enthalpy $H_{1,o}$:

$$\Delta H_1 = |H_{1,i} - H_{1,o}|. \qquad (2)$$

The second enthalpy difference $\Delta H_2$ is defined as the magnitude of the difference between the second fluid inlet enthalpy $H_{2,i}$ and the second fluid outlet enthalpy $H_{2,o}$:

$$\Delta H_2 = |H_{2,i} - H_{2,o}|. \qquad (3)$$

The efficiency factor η is used as required in order to take into account any thermal losses occurring when exchanging thermal energy between the first fluid 1 and the second fluid 2 within the heat exchanger 103. Such thermal losses would include any thermal energy crossing the boundary 113 (e.g. walls/insulation) surrounding the heat exchanger 103 other than through the fluids 1, 2.

In step S12, a value of the second enthalpy difference $\Delta H_2$ of the second fluid 2 is determined by means of the second inlet enthalpy sensor 112i and the second outlet enthalpy sensor 112o. In step S13, the first enthalpy difference $\Delta H_1$ of the first fluid 1 is measured by means or the first inlet enthalpy sensor 111i and the first outlet enthalpy sensor 111o. Alternatively or additionally, the second enthalpy difference $\Delta H_2$ is predicted by looking up its value as described in detail with reference to FIGS. 4 to 6 further down below.

In step S14, the first flow rate $\phi_1$ is calculated by the computer 170 using the energy balance from equation (1) transposed as follows:

$$\Phi_1 = \frac{\Phi_2 \cdot \Delta H_2 \cdot \eta}{\Delta H_1}, \qquad (4a)$$

Hence, in the embodiment of the method according to the present invention illustrated in FIG. 1, the auxiliary flow sensor 121' may be only used in order to be able to determine the first flow rate $\phi_1$ when the second flow rate $\phi_2$ approximates zero, i.e. when the second fluid 2 becomes essentially stationary within the heat exchanger 103. Therefore, the auxiliary flow sensor 121' can be calibrated in that its output value is correlated by means of the computer 170 to the first flow rate $\phi_1$ of the first fluid 1 as calculated in step S14 during times when the second fluid 2 is flowing through the heat exchanger with a second flow rate $\phi_2$ which is sufficient for the calculation.

Figure 3:
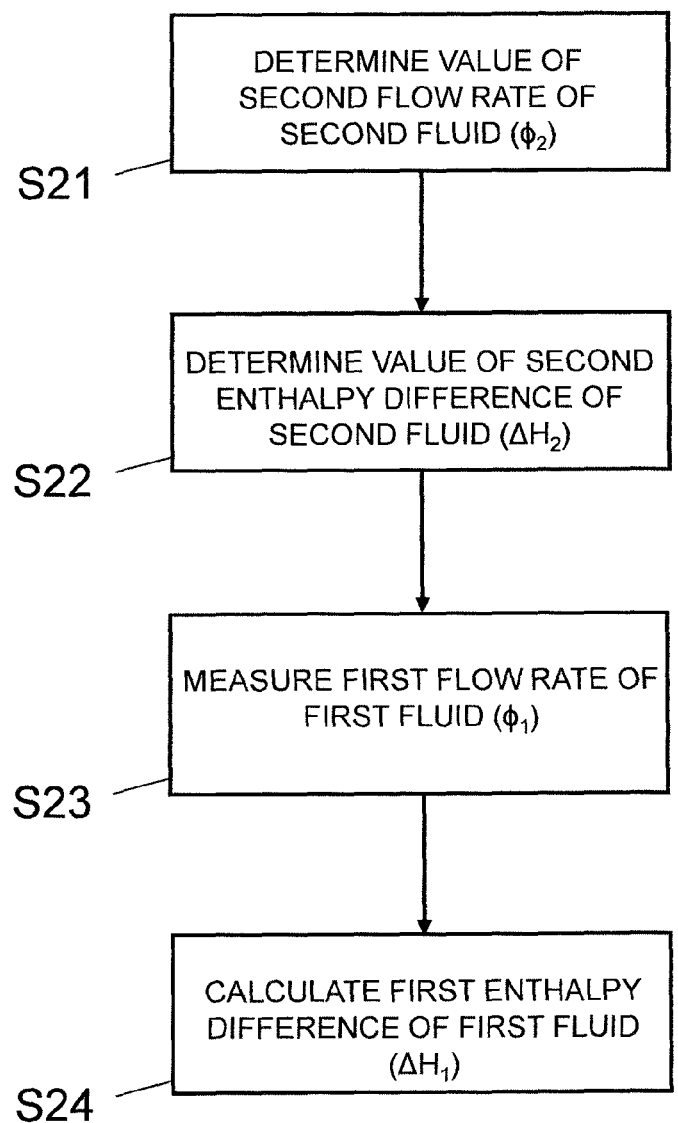
FIG. 3: shows a schematic block diagram illustrating an exemplary sequence of steps for determining a first enthalpy difference of the first fluid according to an embodiment of the present invention.

FIG. 3 shows a schematic block diagram of another embodiment of a method according to the present invention comprising steps S21 to S24. In steps S21 and S22, in line with steps S11 and S12 described with reference to FIG. 2 above, the value of the second flow rate $\phi_2$ and the value of the second enthalpy difference $\Delta H_2$, respectively, are determined. In step 23, the first flow rate $\phi_1$ of the first fluid 1 is measured by means of the first flow sensor 121 or the auxiliary flow sensor 121'. In step S24, the first enthalpy difference $\Delta H_1$ of the first fluid 1 is calculated by the computer 170 based on the energy balance from equation (1) transposed as follows:

$$\Phi_2 = \frac{\Phi_1 \cdot \Delta H_1}{\Delta H_2 \cdot \eta}. \quad (4b)$$

Figure 4:
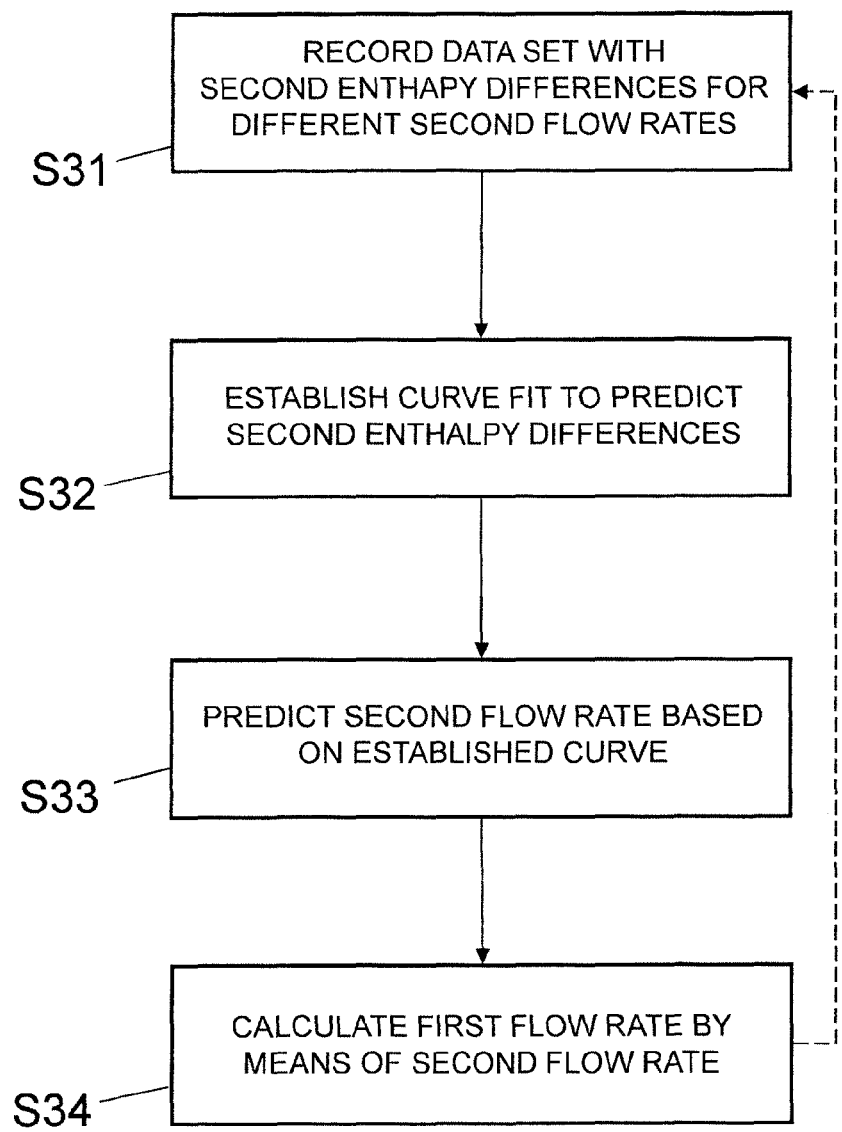
FIG. 4: shows a schematic block diagram illustrating an exemplary sequence of steps for calculating a first flow rate by means of a second flow rate based on a normalized curve of values established by means of at least one measurement dataset according to the present invention.

FIG. 4 shows a schematic block diagram of an embodiment of a method according to the present invention for predicting the second flow rate $\phi_2$ as mentioned above with reference to FIGS. 2 and 3. In a step S31, a measurement dataset 200 is recorded which includes a plurality of data points 202 representing measured second values of the second enthalpy difference $\Delta H_2$ in dependence of values of the second flow rate $\phi_2$.

Figure 5:
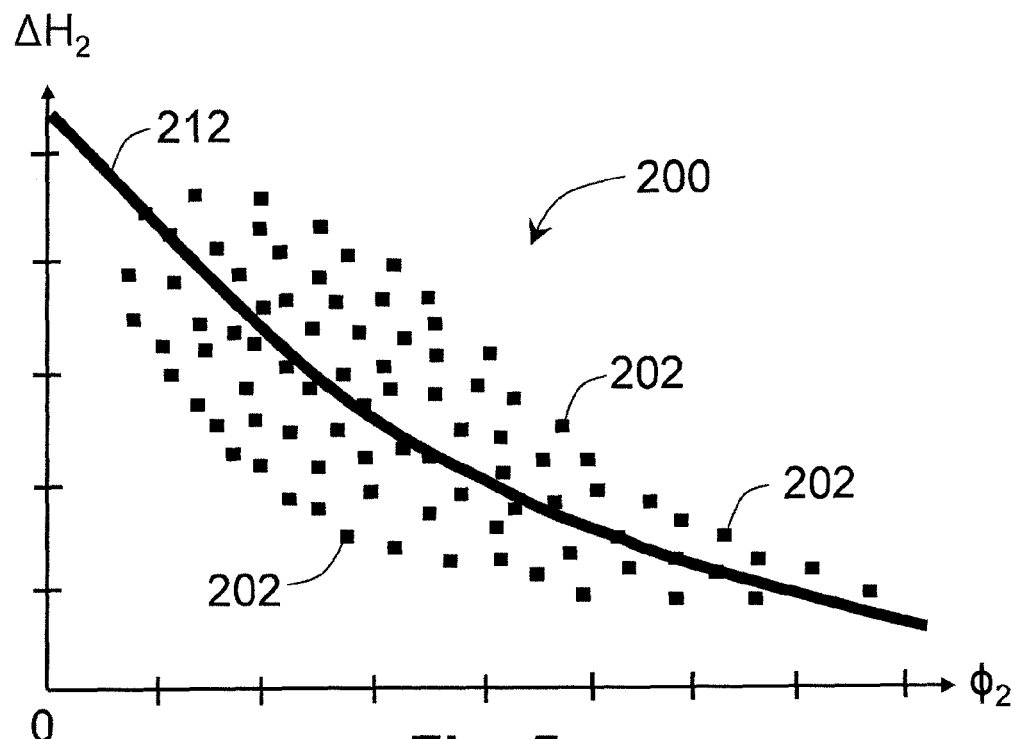
FIG. 5: shows a diagram containing a plurality of data points which represent at least one measurement dataset containing measured values of second enthalpy differences in dependence of values of second flow rates.

FIG. 5 shows an exemplary schematic diagram of the dataset 200 with the plurality of data points 202. A curve 212 may represent a respective average or trend of the data points 202.

Figure 6:
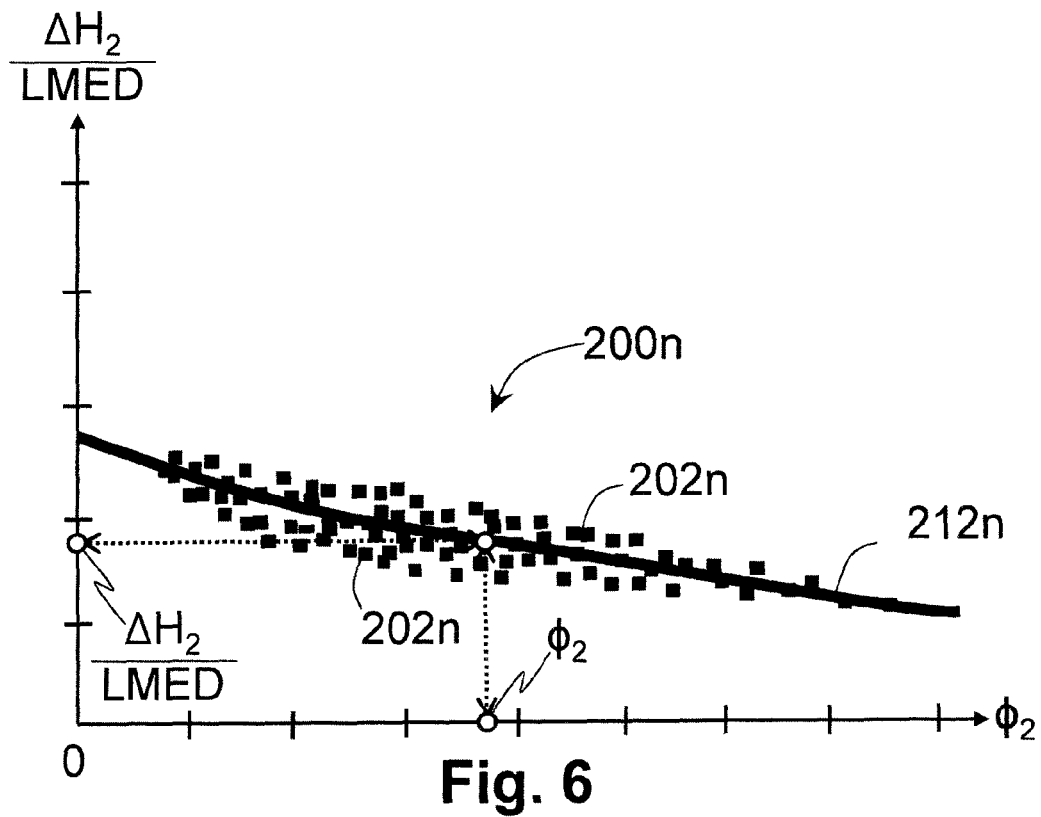
FIG. 6: shows the at least one measurement dataset illustrated in FIG. 5 after normalisation as well as a normalized curve of values established based on the normalized at least one measurement dataset.

In step S32 illustrated in FIG. 4, the computer 170 is used for normalising the measurement dataset so that the measurement data set 200 with the data points 202 becomes a normalized data set 200n with data points 202n as shown in FIG. 6. Normalization of the least one measurement dataset 200 is for example carried out by using a function of an inlet enthalpy difference and/or an outlet enthalpy difference $\Delta H_{out}$. Such a function may be e.g. a logarithmic mean enthalpy difference (LMED):

$$LMED = \frac{\Delta H_{in} - \Delta H_{out}}{\ln(\Delta H_{in}) - \ln(\Delta H_{out})}, \quad (5)$$

wherein the inlet enthalpy difference $\Delta H_{in}$ is a magnitude of the difference between a first fluid inlet enthalpy $H_{1,i}$ and a second fluid inlet enthalpy $H_{2,i}$:

$$\Delta H_{in} = |H_{1,i} - H_{2,i}|, \text{ and} \quad (6)$$

wherein the outlet enthalpy difference $\Delta H_{out}$ is a magnitude of the difference between a first fluid outlet enthalpy $H_{1,o}$ and a second fluid outlet enthalpy $H_{2,o}$:

$$\Delta H_{out} = |H_{1,o} - H_{2,o}|. \quad (7)$$

When using LMED as an example for calculating a logarithmic average of the second enthalpy difference $\Delta H_2$ from the at least one measurement dataset, the function of the second flow rate $\phi_2$ could be defined as:

$$\frac{\Delta H_2}{LMED} = f(\Phi_2). \quad (8)$$

In a step 33, a curve fit is established by the computer 170 for creating a normalized curve 212n of second enthalpy differences $\Delta H_2$ as shown in FIG. 6. Based on the normalized curve 212n, the second flow rate $\phi_2$ may be predicted. Once the relationship is established, it can be used to calculate the second flow rate $\phi_2$ when a temporarily placed auxiliary flow sensor 121' is not present anymore, i.e. it may be omitted because of being virtualized.

For example, the normalized curve 212n may established by determining an e.g. two-parameter curve fit based on two curve fit coefficients $k_1$, $k_2$. The second flow rate $\phi_2$ is then determined based on the established normalized curve 212n according to:

$$\Phi_2 = \frac{1}{k_2} \cdot \left(\frac{k_1}{\Delta H_2} - 1\right). \quad (9)$$

For example, when using the two-parameter curve fit, the power or heat transfer Q would be calculated as:

$$Q = k_1 \cdot (1 - e^{-k_2 \Phi_2}). \quad (10)$$

In the alternative or additionally, the at least one curve fit coefficient $k_1$, $k_2$ may be derived from an enthalpy fit function of the value of the enthalpy difference $\Delta H_2$ dependent on the value of the respective flow rate $\phi_1$, $\phi_2$. For example, when using the two-parameter curve fit, the second enthalpy difference $\Delta H_2$ would be calculated as:

$$\Delta H_2 = \frac{k_1}{1 + k_2 \Phi_2}. \quad (11)$$

In another alternative or further additionally, the at least one curve fit coefficient $k_1$, $k_2$ may be derived from a temperature fit function of a value of a temperature difference $\Delta T_1$, $\Delta T_2$ dependent on the value of the respective flow rate $\phi_1$, $\phi_2$. For example, when using the two-parameter curve fit, the temperature difference $\Delta T_2$ would be calculated as:

$$\Delta T_2 = \frac{k_1}{1 + k_2 \Phi_2}, \quad (12)$$

wherein the second temperature difference $\Delta T_1$, $\Delta T_2$ is the difference between an outlet temperature $T_{1,o}$, $T_{2,o}$ of the respective fluid exiting the heat exchanger and a second fluid inlet temperature $T_{1,i}$, $T_{2,i}$ of the respective fluid entering heat exchanger:

$$\Delta T_2 = T_{2,o} - T_{2,i}. \quad (13)$$

Finally, in a step 35, a first flow rate $\phi_1$ is calculated by means of the second flow rate $\phi_2$ based on the transposed energy balance according to equation (4a) defined above.

Alternatively or additionally to the determination of the normalized curve 212n as explained above with reference to FIGS. 4 to 7, the curve 212 or normalized curve 212n may also be determined based on measured temperatures $T_{1,i}$, $T_{1,o}$, $T_{2,i}$, $T_{2,o}$, and temperature differences $\Delta T_1$, $\Delta T_2$, respectively. Therefore a characteristic heat transfer $Q_{char}$ could be calculated as:

$$Q_{char} = \frac{Q}{\Delta T_{in}}, \quad (14)$$

wherein $Q_{char}$ is the exchanged amount of thermal energy already denoted in equation (1) above, and $\Delta T_{in}$ is an inlet temperature difference calculated as:

$$\Delta T_{in} = T_{1,i} - T_{2,i}. \quad (15)$$

Then a characteristic enthalpy difference $\Delta H_{2,char}$ of the second fluid 2 could be calculated as:

$$\Delta H_{2,char} = \frac{\Delta H_2}{\Delta T_{in}} = \frac{c_{p,2} \cdot \Delta T_2}{\Delta T_{in}}, \quad (16)$$

wherein the second enthalpy difference $\Delta H_2$ could be calculated as:

$$\Delta H_2 = c_{p,2} \cdot \Delta T_2, \qquad (17)$$

wherein $c_{p,2}$ is the specific heat constant of the second fluid 2, and $\Delta T_2$ is the second temperature difference of the second fluid 2 as calculated in equation (13) above.

As another example, if it is further assumed that fluid 1 is a liquid, such as water, glycol, or a mixture thereof, and fluid 2 is a gas or gas mixture, such as air, when no dehumidification takes place, $Q_{char}$ could be calculated by:

$$Q_{char} = \frac{Q}{\Delta H_{in}}, \qquad (18)$$

$$\Delta H_{2,char} = \frac{\Delta H_2}{\Delta H_{in}} = K \frac{\Delta H_2}{\Delta T_{in}} = K \frac{c_{p,2} \cdot \Delta T_2}{\Delta T_{in}}, \qquad (19)$$

wherein the constant K includes the unchanging humidity and specific characteristics of an HVAV installation, in particular the heat exchanger 103 thereof.

Figure 7:
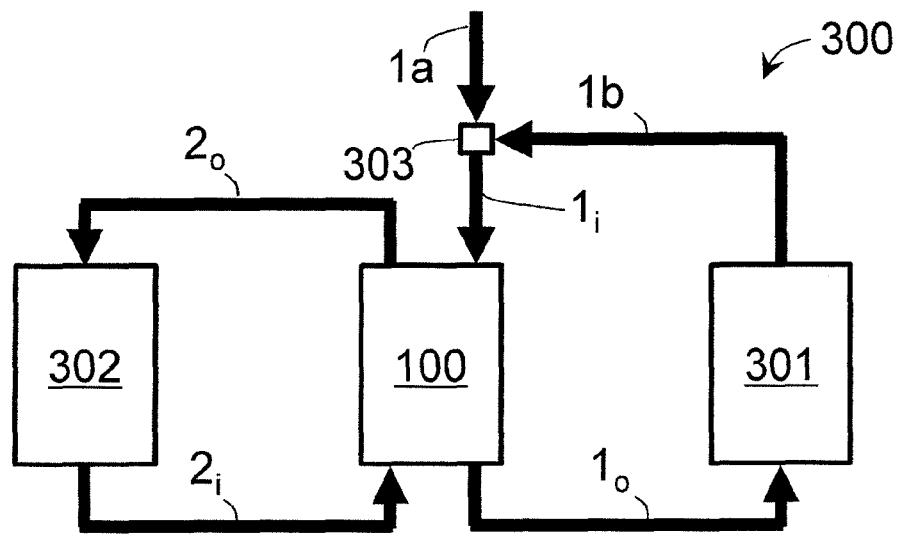
FIG. 7: shows a schematic diagram illustrating an arrangement, such as an HVAC installation, according to an embodiment of the present invention.

FIG. 7 shows a schematic diagram illustrating an arrangement 300, such as an HVAC installation, according to an embodiment of the present invention. The arrangement 300 comprises the system 100 similar to FIG. 1 as well as a zone 301, a plant 302 and a mixing unit 303. The system 100 in this context may be e.g. an air handling unit (AHU). The zone 301 may be e.g. a zone in a building or an area to be provided with processed fluids, such as fresh or warm air, as the first fluid 1. The plant 302 may e.g. provide a stream of cool or hot liquid which is fed to the system 100 as the second fluid 2 on a primary side in order to cool or heat the first fluid 2, e.g. air.

The first outlet fluid $1_o$ exiting the system 100 enters the zone 301 and is there used and/or processed. After usage and/or processing, the first fluid 1 exits the zone 301 as a partial fluid $1b$, which is then fed, into the mixing unit 303. In the mixing unit 303, the partial fluid $1b$ is mixed with another partial fluid $1a$. From mixing the partial fluids $1a$ and $1b$ in a desired mixing ratio, the first inlet fluid $1_i$ entering the system 100 is obtained. The partial fluid $1a$ may be e.g. air used in the zone 301. The other partial fluid $1b$ may be e.g. outside or outdoor air. Hence, the partial fluid $1b$ could be regarded as a recycled air stream.

Figure 8:
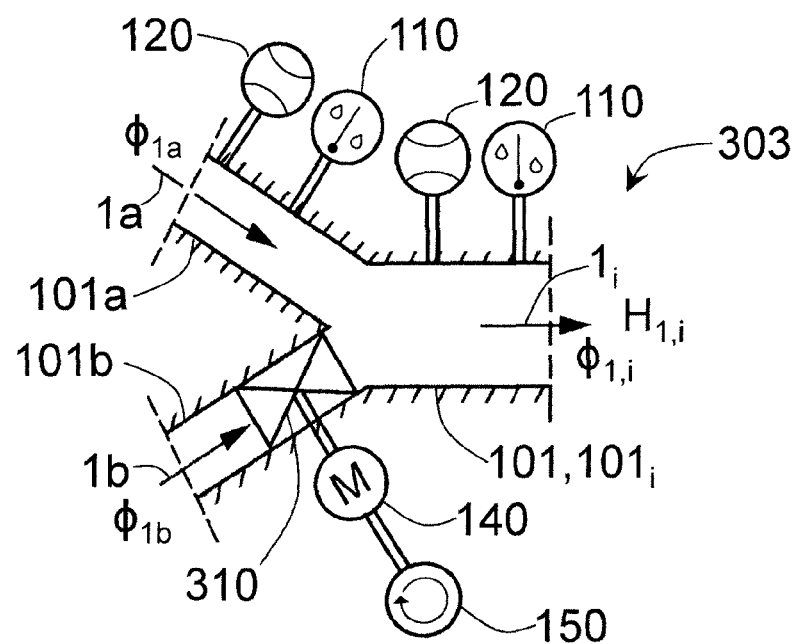
FIG. 8: shows a schematic illustration of the mixing unit depicted in FIG. 8.

FIG. 8 shows a schematic illustration of the mixing unit 303 depicted in FIG. 7. In the mixing unit 303, two branch fluid lines, a branch fluid line 101a, and another branch fluid line 101b, both leading into the first fluid line 101, in particular the inlet section of the first fluid line $101_i$, which may therefore be regarded as a main fluid line. The branch fluid line $1a$ and the first fluid line 101 are each provided with an enthalpy sensor 110 and a flow sensor 120. The other branch fluid line 101b is provided with a valve or flap 310 driven by the motor or drive 140 provided with a meter 150.

By measuring a flow rate $\phi_{1a}$ of the partial fluid $1a$ and a flow rate $\phi_{1,i}$ of the first inlet fluid $101_i$, a flow rate $\phi_{1b}$ of the partial fluid $1a$ may be calculated. Ideally, the flow rates $\phi$ and branch flow rate $\phi_j$ of each of the branches a to N may be calculated by:

$$\Phi = \sum_{j=a}^{N} \Phi_j. \qquad (20)$$

As an ideal mixture, the enthalpy $H_{1,i}$ of the first inlet fluid $101_i$ could then be derived. Ideally, the enthalpies H and branch enthalpies of each of the branches a to N may be calculated by:

$$\Phi H = \sum_{j=a}^{N} \Phi_j H_j. \qquad (21)$$

Hence, any enthalpy sensors 110 or flow sensors 120 associated to the branch fluid line 101b for measuring the enthalpy or mass flow of the partial fluid $1b$ could be omitted. Not for all of the branches or their combinations, respective flow rates and enthalpies have to be measured. By deriving at least some of the flow rates and enthalpies from equations (20) and (21) above, at least one more sensor may be calibrated, normalized, parameterized, and/or virtualized.

In turn, alternatively and/or additionally, the other branch fluid line 101b is provided with the valve or flap 310 for regulating the mixing process through the flow rate $\phi_{1b}$ of the other partial fluid $1b$. Similarly as with any pump or fan 130, the flow rate $\phi_{1b}$ of the other partial fluid $1b$ may be determined through an operational parameter, such as a position of the valve or flap 310, the motor 150, which may be obtained with the meter 150 as described above with reference to the system 100 and related sequences of steps shown in FIGS. 1 to 6.

Figure 9:
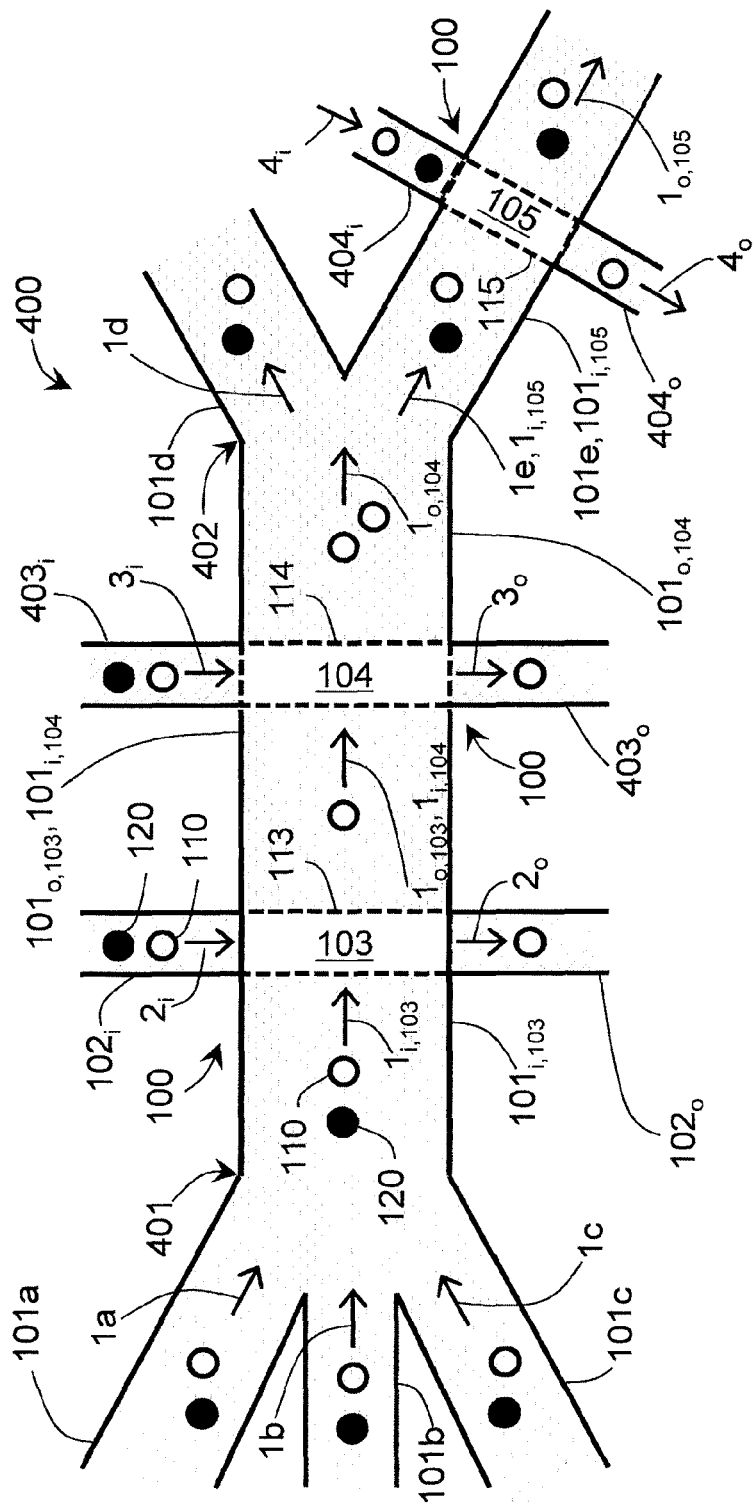
FIG. 9: shows a schematic diagram illustrating another arrangement, such as a heat exchanger network, according to an embodiment of the present invention.

FIG. 9 shows a diagram illustrating another arrangement 400, such as a heat exchanger network, according to an embodiment of the present invention. The arrangement 400 comprises the system 100 similar to FIG. 1 with the heat exchanger 103, and corresponding systems 100 comprising the further heat exchanger 104 and the auxiliary heat exchanger 105, respectively. Moreover, the arrangement 400 comprises a further mixing unit 401 and a splitting unit 402. In a similar manner as described with reference to FIG. 1 above, a further envelope boundary 114 and an auxiliary envelope boundary 115 may be defined for the further heat exchanger 104 and the auxiliary heat exchanger 105, respectively.

The fluids 1, 2 may diverge into partial fluids $1a$, $1b$, $1c$, $1d$, $1e$, such as partial flows and streams, or merged therefrom in any desired number and configuration and involving respective branch fluid lines 101a, 101b, 101c, 101d, 101e. Further fluids 3 and additional fluids 4 may be used in configurations to exchange thermal energy with the fluid 1 in at least one further heat exchanger 104 and auxiliary heat exchanger 105, respectively. A skilled person will understand that principles underlying embodiments of the present invention described with reference to FIGS. 1 to 6 above, may be expanded to more complex setups as illustrated in FIGS. 7 to 9 involving said partial fluids $1a$, $1b$, $1c$, $1d$, $1e$, further fluids 3, additional fluids 4, and respective further and auxiliary heat exchangers 104, 105 associated to any desired number of the systems 100.

Within the further mixing unit 401, three partial fluids $1a$, $1b$, $1c$ are mixed with each other in a desired mixing ration in order to obtain the first inlet fluid $1_{i,103}$ entering the heat exchanger or the respective envelope boundary 113. Within the heat exchanger 103, the first fluid 1 and the second fluid 2 may exchange thermal energy between each other as described above with reference to the system 100 and related sequences of steps shown in FIGS. 1 to 6. When exiting the heat exchanger 103 or the respective envelope boundary 113 as first outlet fluid $1_{o,103}$, the first fluid 1 becomes a further first inlet fluid $1_{i,104}$ entering the further heat exchanger 104 or the respective envelope boundary 114.

Within the further heat exchanger 104 or the respective further envelope boundary 114 of the further system 100, the first fluid 1 and the further fluid 3 may exchange thermal energy between each other in a similar manner as described above with reference to the system 100 and related sequences of steps shown in FIGS. 1 to 6. The further fluid 3 enters the further heat exchanger 104 or the respective envelope boundary 114 as a further inlet fluid 3, through a further fluid line 403, in particular a further inlet fluid line $403_i$. The further fluid 3 exits the further heat exchanger 104 or the respective envelope boundary 114 as a further outlet fluid $3_o$ through the further fluid line 403, in particular a further inlet fluid line $403_o$. The first fluid 1 exits the further heat exchanger 104 as a further first outlet fluid $1_{i,104}$ and enters the splitting unit 402.

Within the splitting unit 402, the first fluid 1 as the further first outlet fluid $1_{i,104}$ from the fluid line 101, in particular a further first outlet fluid line $101_{o,104}$, is split into a partial fluid 1d and a partial fluid 1e flowing through a branch fluid line 101d and a branch fluid line 101e, respectively. The partial fluid 1d may be handled in a desired manner, e.g. recycled, discharged, etc. The partial fluid 1e enters the auxiliary heat exchanger 105 as an auxiliary first inlet fluid $1_{i,105}$ through the branch fluid line 101e, in particular an auxiliary first inlet fluid line $101_{i,105}$.

Within the auxiliary heat exchanger 105 or the respective auxiliary envelope boundary 115 of the auxiliary system 100, the first fluid 1, in particular the partial fluid 1e, and the auxiliary fluid 4 may exchange thermal energy between each other in a similar manner as described above with reference to the system 100 and related sequences of steps shown in FIGS. 1 to 6. The auxiliary fluid 4 enters the auxiliary heat exchanger 105 or the respective envelope boundary 115 as an auxiliary inlet fluid 4, through an auxiliary fluid line 404, in particular an auxiliary inlet fluid line $404_i$. The auxiliary fluid 4 exits the auxiliary heat exchanger 105 or the respective envelope boundary 115 as an auxiliary outlet fluid $4_o$ through the auxiliary fluid line 404, in particular an auxiliary outlet fluid line $404_o$. The partial fluid 1e exits the auxiliary heat exchanger 105 as an auxiliary first outlet fluid $1_{o,105}$.

The fluid lines 101, 101a-e, $101_{i,103}$, $101_{o,103}$, $101_{i,104}$, $101_{o,104}$, $101_{i,105}$, $101_{i,105}$, $101_{o,105}$, 102, $102_i$, $102_o$, 403, $403_i$, $403_o$, 404, $404_i$, $404_o$ are provided with the enthalpy sensors 110 and/or the flow sensors 120 as required in a manner to calibrate, normalize, parameterize, and/or virtualize at least some of the sensors 110, 111, 111i, 111o, 112, 112i, 112o, 120, 120', 121, 122, drives or motors 140, 141, 142, meters 150, 151, 152, and/or valves or dampers 310 in the sense of the present invention. Hence, at least one of the enthalpy sensors 110 and/or the flow sensors 120 may be omitted as described above with reference to the system 100 and related sequences of steps shown in FIGS. 1 to 6.

Deviations from the above-described examples are possible without departing from the inventive idea. A skilled person will understand without any difficulties that the first fluid 1 and the second fluid 2 may be any kind of combination of fluids, between which an exchange of thermal energy should be carried out. However, the present invention may be especially useful if the first fluid 1 is a gas, such as air flowing in the first fluid line 101 having a relatively large diameter, and the second fluid 2 is a liquid, such as water. The further fluid 3 and the auxiliary fluid may also be chosen or determined by whatever liquids or gasses are desired to be used in a heat exchange process, in particular for economizing, pre-heating, additional heating and/or super heating purposes as required.

The system 100 may comprise first fluid lines 101 with inlet sections 101i and outlet sections 100o as well as second fluid lines 102 with inlet sections 102i and outlet sections 100o, branch fluid lines 101a-e, further fluid lines 403, further inlet fluid lines $403_i$, further outlet fluid lines $403_o$, auxiliary fluid lines 404, auxiliary inlet fluid lines $404_i$, auxiliary outlet fluid lines $404_o$ in whatever number and form desired, e.g. as ducts, tubes, pipes, hoses or alike, for leading the fluids 1, 2, 3, 4 to the heat exchangers 103, 104, 105 and away therefrom. The heat exchangers 103, 104, 105 may be and/or comprise any kind of thermal heat exchanging devices designed according to the specifically desired requirements.

For measuring enthalpies, any desired number of enthalpy sensors 110, first enthalpy sensors 111, 111i, 111o and second enthalpy sensors 112, 112i, 112o may be used at preferred positions along the envelope boundaries 113, 114, 115 of the heat exchangers 103, 104, 105. The enthalpy sensors 110, 111, 111i, 111o, 112, 112i, 112o may be combined temperature and humidity sensors which may comprise separated temperature and humidity sensors in whatever number and form required for measuring temperature and humidity of a gaseous fluid. If a humidity measurement is not required when handling a liquid fluid, such as water, the enthalpy sensors 110, 111, 111i, 111o, 112, 112i, 112o may only comprise temperature sensors for measuring respective temperatures of the liquid fluids.

The flow sensors 120, 120', 121, 122 may be any kind of flow sensor desired for measuring a volumetric flow and/or mass flow of the respective fluid 1, 2, 3, 4 and deriving therefrom a mass flow. Therefore, the flow sensors 120, 120', 121, 121' 120 may comprise pressure sensors in any number and form required.

The pumps or fans 130, 131, 132 may be pumps or fans in any number and form required for moving the first fluid 1, the second fluid 2, the further fluid 3 and the auxiliary fluid 4, respectively. Therefore, the pumps and fans 130, 131, 132 may comprise drives 140, 141, 142 in any number and form required for driving the pumps or fans 130, 131, 132. The drives 140, 141, 142 may comprise motors, gears and transmission devices in whatever number and form required for driving the pumps or fans 130, 131, 132. The pumps or fans 130, 131, 132 and/or the drives 140, 141, 142 may be provided with meters 150, first meters 151 and/or second meters 152, respectively, in whatever number and form desired for measuring an operational parameter of the pumps or fans 131, 132 and/or the drives 141, 142, such as a frequency, current, voltage, pressure, position or alike.

The data transmission lines 160 may comprise any kind of wired or wireless connections allowing for exchanging analogue and/or digital information between all sensors 110, 111, 111i, 111o, 112, 112i, 112o, 120, 120', 121, 122, drives or motors 140, 141, 142, meters 150, 151, 152 and the computer 170 with its processor 180 may be any kind of local or distributed computer system. A skilled person will understand without difficulties that the computer 170 may comprise interfaces and converters in whatever number and form required for conditioning data or voltages received over the transmission lines 160 in such a way that the data or voltages can be computed by the processor 180 when carrying out instructions.

The instructions may be stored on the computer readable medium 190 in whatever number and form desired. The computer readable medium 190 maybe any kind of volatile and non-volatile storage means, which may be built into the computer, may be accessed by the computer through a public or private network, and/or maybe a portable storage medium such as a portable flash storage, optical data carrier, magnetic data carrier, or alike.

The measurement dataset 200 may comprise data points 202 in whatever number and form desired for generating curves 212, normalized data points 202n and normalized curves 212n. Hence, data points 202 may comprise measured values in whatever number and form desired. Normalized data points 202n may be based on data points 202 in whatever number and form desired.

The arrangements 300, 400 may be HVAC installations, heat exchanger networks, power plants, chemical facilities, pharmaceutical facilities, refineries or alike comprising systems 100, zones 301, plants, mixing units 303, valves or dampers 310, further mixing units 401, splitting units 402, further fluid lines 403 and/or auxiliary fluid lines 404 in whatever number and form required for a certain application. The zones 301, plants, mixing units 303, valves or dampers 310, further mixing units 401, splitting units 402, further fluid lines 403 and/or auxiliary fluid lines 404 may be connected to each other, merged or split as required by a certain application.

The first fluid lines 101 with inlet sections 101i and outlet sections 100o as well as second fluid lines 102 with inlet sections 102i and outlet sections 100o, branch fluid lines 101a-e, further fluid lines 403, further inlet fluid lines 403$_i$, further outlet fluid lines 403$_o$, auxiliary fluid lines 404, auxiliary inlet fluid lines 404$_i$, and/or auxiliary outlet fluid lines 404$_o$ may be provided with sensors 110, 111, 111i, 111o, 112, 112i, 112o, 120, 120', 121, 122, drives or motors 140, 141, 142, meters 150, 151, 152, and/or valves or dampers 310 in whatever number and form desired for measuring, determining, and/or controlling properties and operational parameters of the fluids 1, 2, 3, 4. The sensors 110, 111, 111i, 111o, 112, 112i, 112o, 120, 120', 121, 122, drives or motors 140, 141, 142, meters 150, 151, 152, and/or valves or dampers 310 may be connected to each other, to the computer 170 and/or the processor 180 via data transmission lines 160 which may comprise any kind of wired or wireless connections allowing for exchanging analogue and/or digital information.

Finally, it should be noted that, in the description, the computer program code has been associated with specific functional modules or processors, and the sequence of the steps has been presented in a specific order, one skilled in the art will understand, however, that the computer program code may be structured differently and that the order of at least some of the steps could be altered, without deviating from the scope of the invention. For example, one skilled in the art will understand that at least some of the functions and operations described above can be implemented and performed on the computer 170 and the at least one processor 180.

| Reference Signs List | |
|---|---|
| 1 | first fluid |
| 1a-e | partial fluid or stream |
| 2 | second fluid |
| 3 | further fluid |
| 4 | auxiliary fluid |
| 100 | system |
| 101 | first fluid line |
| 101a-e | branch fluid lines |
| 101i | inlet section of first fluid line |

-continued

| Reference Signs List | |
|---|---|
| 101o | outlet section of first fluid line |
| 102 | second fluid line |
| 102i | inlet section of second fluid line |
| 102o | outlet section of second fluid line |
| 103 | heat exchanger |
| 103 | heat exchanger |
| 104 | further heat exchanger |
| 105 | auxiliary heat exchanger |
| 110 | enthalpy sensor |
| 111 | first enthalpy sensor |
| 111' | first auxiliary enthalpy sensor |
| 111i | first inlet enthalpy sensor |
| 111o | first outlet enthalpy sensor |
| 112 | second enthalpy sensor |
| 112' | second auxiliary enthalpy sensor |
| 112i | second inlet enthalpy sensor |
| 112o | second outlet enthalpy sensor |
| 113 | envelope boundary |
| 114 | further envelope boundary |
| 115 | auxiliary envelope boundary |
| 116 | surroundings/environment |
| 120 | flow sensor |
| 121' | auxiliary flow sensor |
| 121 | first flow sensor |
| 122 | second flow sensor |
| 130 | pump or fan |
| 131 | first pump or fan |
| 132 | second pump or fan |
| 140 | drive or motor |
| 141 | first drive or motor |
| 142 | second drive or motor |
| 150 | meter |
| 151 | first meter |
| 152 | second meter |
| 160 | transmission line |
| 170 | computer |
| 180 | processor |
| 190 | computer-readable medium |
| 200 | measurement data set |
| 200n | normalized data set |
| 202 | data point |
| 202n | normalized data point |
| 212 | curve |
| 212n | normalized curve |
| 300 | Arrangement/HVAC installation |
| 301 | Zone |
| 302 | Plant |
| 303 | Mixing unit |
| 310 | valve or damper |
| 400 | arrangement/heat exchanger network |
| 401 | Further mixing unit |
| 402 | Splitting unit |
| 403 | Further fluid line |
| 404 | Auxiliary fluid line |
| H | enthalpy |
| T | temperature |
| i | in/inlet |
| o | out/outlet |
| Δ | difference |
| η | efficiency factor |
| φ | Flow rate/mass flow |

The invention claimed is:

1. A method for operating an HVAC installation (200, 300) using a computer system (170) comprising one or more processors (180) controlled by computer program code, wherein a set of enthalpies ($H_{1,i}$, $H_{2,i}$, $H_{1,o}$, $H_{2,o}$) and flow rates ($\phi_1$, $\phi_2$) as variables of the HVAC installation (200, 300) is monitored and used for controlling the operation of said HVAC installation (200, 300), comprising the steps of:
   a. dividing said set of enthalpies ($H_{1,i}$, $H_{2,i}$, $H_{1,o}$, $H_{2,o}$) and flow rates ($\phi_1$, $\phi_2$) into a first and second subset;
   b. measuring each variable of said first subset with a related sensor (110, 120) arranged in said HVAC installation (200, 300); and c. determining the variables of said second subset from the measured variables of said first subset by using a mathematical and/or empirical relationship between the variables of said first and second subset.

2. The method of claim 1, wherein at least one non-calibrated auxiliary sensor (121') is provided to measure one variable of said second subset, and said at least one non-calibrated auxiliary sensor (121') is calibrated by using the respective determined variable of said second subset.

3. The method of claim 1, wherein at least one of said variables of said first subset is kept constant.

4. The method of claim 3, wherein the actual value of said constant variable is only once measured with a sensor.

5. The method of claim 1, wherein a set of values associated with a heat exchanger (103) of the HVAC installation (300) is determined, the set comprising: flow rates ($\phi_1$, $\phi_2$) and enthalpy differences ($\Delta H_1$, $\Delta H_2$) of a first fluid (1) and a second fluid (2) in a configuration for exchanging thermal energy (Q) between the fluids (1, 2) through the heat exchanger (103),
the enthalpy differences ($\Delta H_1$, $\Delta H_2$) each being a difference between a fluid inlet enthalpy ($H_{1,i}$, $H_{2,i}$) and a fluid outlet enthalpy ($H_{1,o}$, $H_{2,o}$) of the fluids (1, 2) when entering and exiting the heat exchanger (103), respectively,
the method comprising:
measuring a subset of values comprising at least two values of: the flow rates ($\phi_1$, $\phi_2$) and the enthalpy differences ($\Delta H_1$, $\Delta H_2$); and
determining the complete set of values, using the measured subset of the values.

6. The method of claim 5, wherein a full or complete set of values of an energy balance equation set up with respect to an energy related envelope boundary (113, 114, 115) of a heat exchanger (103, 104, 105) is determined.

7. The method of claim 6, wherein the energy balance equation comprises at least one efficiency factor ($\eta$) representing a thermodynamic loss with respect to the respective envelope boundary (113, 114, 115).

8. The method of claim 5, wherein at least one of the values of the flow rates ($\phi_1$, $\phi_2$) and the enthalpy differences ($\Delta H_1$, $\Delta H_2$) is used for calibrating a non-calibrated auxiliary flow sensor (121') or a non-calibrated auxiliary enthalpy sensor (111', 112') for acquiring the value of one of the flow rates ($\phi_1$, $\phi_2$) or enthalpy differences ($\Delta H_1$, $\Delta H_2$), respectively.

9. The method of claim 8, wherein the non-calibrated auxiliary enthalpy sensor (111', 112') comprises at least one of: a non-calibrated auxiliary temperature sensor and a non-calibrated auxiliary humidity sensor used in conjunction with a look up table or function for determining a value of at least one of said enthalpies ($H_{1,i}$, $H_{2,i}$, $H_{1,o}$, $H_{2,o}$).

10. The method of claim 5, wherein at least one of the values of the flow rates ($\phi_1$, $\phi_2$) is a predetermined constant value.

11. The method of claim 10, wherein the predetermined constant value is determined using a temporary flow sensor (121, 121', 122), temporarily placed for measuring the value of the respective flow rate ($\phi_1$, $\phi_2$).

12. The method of claim 5, wherein at least one of the values of the flow rates ($\phi_1$, $\phi_2$) is determined by means of an operational parameter of at least one of: a pump (131), a fan (132), a valve and a damper configured to respectively move, direct, block, split or merge at least one of the fluids (1, 2).

13. The method of claim 12, wherein the at least one operational parameter is a variable operational parameter of a drive (141, 142) of the pump (131), fan (132), valve or damper.

14. The method of claim 5, further comprising:
recording in a computer (170) at least one measurement data set (200) which includes a plurality of data points (202) representing measured values of at least one of the enthalpy differences ($\Delta H_1$, $\Delta H_2$) in dependence of values of the respective flow rate ($\phi_1$, $\phi_2$);
calculating by the computer (170) a curve (212) or lookup table of values of the enthalpy difference ($\Delta H_1$, $\Delta H_2$) from the at least one measurement data set (200); and
predicting the enthalpy difference ($\Delta H_1$, $\Delta H_2$) or the respective flow rate ($\phi_1$, $\phi_2$) by looking up a corresponding value of the respective flow rate ($\phi_1$, $\phi_2$) or of the enthalpy difference ($\Delta H_1$, $\Delta H_2$), respectively, based on the curve (212) or lookup table.

15. The method of claim 14, wherein calculation of the curve (212) or lookup table involves calculating based on the at least one measurement data set (200) a function of an inlet enthalpy difference ($\Delta H_{in}$) and/or an outlet enthalpy difference ($\Delta H_{out}$),
the inlet enthalpy difference ($\Delta H_{in}$) being a difference between a first fluid inlet enthalpy ($H_{1,i}$) and a second fluid inlet enthalpy ($H_{2,i}$), and
the outlet enthalpy difference ($\Delta H_{out}$) being a difference between a first fluid outlet enthalpy ($H_{1,o}$) and a second fluid outlet enthalpy ($H_{2,o}$).

16. The method of claim 14, wherein calculation of the curve (212) or lookup table involves calculating based on the at least one measurement data set (200) a function of an inlet temperature difference ($\Delta T_{in}$) and/or an outlet temperature difference ($\Delta T_{out}$),
the inlet temperature difference ($\Delta T_{in}$) being a difference between a first fluid inlet temperature ($T_{1,i}$) and a second fluid inlet temperature ($T_{2,i}$), and
the outlet temperature difference ($\Delta T_{out}$) being a difference between a first fluid outlet temperature ($T_{1,o}$) and a second fluid outlet temperature ($T_{2,o}$).

17. The method of claim 14, wherein at least one of the values of the flow rates ($\phi_1$, $\phi_2$) and the enthalpies ($H_{1,i}$, $H_{2,i}$, $H_{1,o}$, $H_{2,o}$) is temporarily measured by means of at least one of a temporarily placed flow sensor (120, 121, 121', 122) and a temporarily placed enthalpy sensor (110, 111, 111', 112, 112'), respectively, preferably during a commissioning of the heat exchanger (103), for establishing a curve fit of the curve (212) of values of the enthalpy difference ($\Delta H_1$, $\Delta H_2$) with respect to the at least one measurement data set (200).

18. The method of claim 17 wherein establishing the curve fit is based on at least one curve fit coefficient ($k_1$, $k_2$).

19. The method of claim 18, wherein the at least one curve fit coefficient ($k_1$, $k_2$) is derived from a power fit function of the thermal energy (Q) exchanged dependent on the value of the respective flow rate ($\phi_1$, $\phi_2$).

20. The method of claim 18, wherein the at least one curve fit coefficient ($k_1$, $k_2$) is derived from an enthalpy fit function of the value of the enthalpy difference ($\Delta H_1$, $\Delta H_2$) dependent on the value of the respective flow rate ($\phi_1$, $\phi_2$).

21. The method of claim 18, wherein the at least one curve fit coefficient ($k_1$, $k_2$) is derived from a temperature fit function of a value of a temperature difference ($\Delta T_1$, $\Delta T_2$) dependent on the value of the respective flow rate ($\phi_1$, $\phi_2$),
the temperature difference ($\Delta T_1$, $\Delta T_2$) being a difference between an outlet temperature ($T_{1,o}$, $T_{2,o}$) of the respective fluid (1, 2) exiting the heat exchanger (103) and a fluid inlet temperature ($T_{1,i}$, $T_{2,i}$) of the respective fluid (2) entering the heat exchanger (103).

22. The method of claim 5, further comprising:
normalizing at least one of the measurement data set (200), data point (202) or any curve (212) or lookup table derived therefrom in order to obtain at least one of a normalized data set (200n), normalized data point (202n), normalized curve (212n) or normalized lookup table.

23. The method of claim 1, wherein at least one of the values of the flow rates ($\phi_1$, $\phi_2$) or the enthalpies ($H_1$, $H_2$) is derived from a corresponding value of a branch flow rate ($\phi_{1a}$, $\phi_{1b}$) or a branch enthalpy ($H_{1a}$, $H_{1b}$) of a partial fluid (1a, 1b) stream of at least one of the fluids (1, 2).

24. The method of claim 1, wherein the first fluid (1) is a gas or gas mixture, especially air, and the second fluid (2) is a liquid or liquid mixture, especially water, glycol or a mixture thereof.

25. An arrangement (200, 300), in particular an HVAC installation or a heat exchanger network using a computer system (170) comprising one or more processors (180) controlled by computer program code, wherein a set of enthalpies and flow rates as variables of the HVAC installation (200, 300) or heat exchanger network is monitored and used by said computer system for controlling the operation of said HVAC installation (200, 300) or heat exchanger network, comprising:
  a. at least one of said processors for dividing said set of enthalpies and flow rates into a first and second subset;
  b. a related sensor (110, 120) arranged in said HVAC installation (200, 300) or heat exchanger network for measuring each variable of said first subset; and
  at least one of said processors for determining the variables of said second subset from the measured variables of said first subset by using a mathematical and/or empirical relationship between the variables of said first and second subset.

26. An arrangement (200, 300) according to claim 25, further comprising a system (100) for determining a set of values associated with a heat exchanger (103), the set comprising: flow rates ($\phi_1$, $\phi_2$) and enthalpy differences ($\Delta H_1$, $\Delta H_2$) of a first fluid (1) and a second fluid (2) in a configuration for exchanging thermal energy (Q) between the fluids (1, 2) through the heat exchanger (103),
the enthalpy differences ($\Delta H_1$, $\Delta H_2$) each being a difference between a fluid inlet enthalpy ($H_{1,i}$, $H_{2,i}$) and a fluid outlet enthalpy ($H_{1,o}$, $H_{2,o}$) of the fluids (1, 2) when entering and exiting the heat exchanger (103), respectively,
the system (100) comprising a computer (170) with a processor (180) configured to:
measure a subset of values comprising at least two values of: the flow rates ($\phi1$, $\phi2$) and the enthalpy differences ($\Delta H_1$, $\Delta H_2$); and
determine the complete set of values using the measured subset of the values.

27. An arrangement (200, 300) according to claim 25, further comprising at least one of: a mixing unit (303, 401) and a splitting unit (402) merging or diverging, respectively, a number m of fluids ($1_i$, $1_o$) and partial fluids (1a, 1b, 1c, 1d, 1e) having a number of m respective flow rates ($\phi_{1,i}$, $\phi_{1,o}$) and partial flow rates ($\phi_{1,a}$, $\phi_{1,b}$, $\phi_{1,c}$, $\phi_{1,d}$, $\phi_{1,c}$) and a number of m respective enthalpies ($H_{1,i}$, $H_{1,o}$) and partial enthalpies ($H_{1a}$, $H_{1b}$, $H_{1c}$, $H_{1e}$, $H_{1f}$), wherein the system (100) is configured to measure a number of maximally m-1 of the flow rates ($\phi_{1,i}$, $\phi_{1,o}$), partial flow rates ($\phi_{1,a}$, $\phi_{1,b}$, $\phi_{1,c}$, $\phi_{1,d}$, $\phi_{1,c}$), enthalpies ($H_{1,i}$, $H_{1,o}$) and partial enthalpies ($H_{1a}$, $H_{1b}$, $H_{1c}$, $H_{1e}$, $H_{1f}$), and to calculate from the measured maximally m-1 flow rates ($\phi_{1,i}$, $\phi_{1,o}$), partial flow rates ($\phi_{1,a}$, $\phi_{1,b}$, $\phi_{1,c}$, $\phi_{1,d}$, $\phi_{1,c}$), enthalpies ($H_{1,i}$, $H_{1,o}$), and partial enthalpies ($H_{1a}$, $H_{1b}$, $H_{1c}$, $H_{1e}$, $H_{1f}$) at least one of the flow rates ($\phi_{1,i}$, $\phi_{1,o}$), partial flow rates ($\phi_{1,a}$, $\phi_{1,b}$, $\phi_{1,c}$, $\phi_{1,d}$, $\phi_{1,e}$), enthalpies ($H_{1,i}$, $H_{1,o}$), and partial enthalpies ($H_{1a}$, $H_{1b}$, $H_{1c}$, $H_{1e}$, $H_{1f}$).

28. A computer program product comprising a non-transient computer-readable medium (190) having stored thereon computer program code configured to control one or more processors (180) of a computer system (170) for operating an HVAC installation (200, 300) by monitoring a set of enthalpies and flow rates as variables of the HVAC installation (200, 300) and using the set of enthalpies and flow rates for controlling the operation of said HVAC installation (200, 300), such that the computer (170)
  a. divides said set of enthalpies and flow rates into a first and second subset;
  b. measures each variable of said first subset with a related sensor (110, 120) arranged in said HVAC installation (200, 300); and
  determines the variables of said second subset from the measured variables of said first subset by using a mathematical and/or empirical relationship between the variables of said first and second subset.

* * * * *